United States Patent [19]

Okazaki et al.

[11] Patent Number: 4,772,832

[45] Date of Patent: Sep. 20, 1988

[54] GUIDING METHOD FOR AUTONOMOUS TRAVELING VEHICLE

[75] Inventors: Mamoru Okazaki, Daitoh; Hisao Tomikawa, Takatsuki; Masahiro Sudare, Higashi-Osaka, all of Japan

[73] Assignee: Tsubakimoto Chain Co., Japan

[21] Appl. No.: 40,175

[22] Filed: Apr. 17, 1987

[30] Foreign Application Priority Data

Jul. 11, 1986 [JP] Japan ................ 61-164213

[51] Int. Cl.$^4$ .............................................. G05D 1/00
[52] U.S. Cl. ................... 318/587; 364/424.02
[58] Field of Search ............. 318/587, 586; 180/169, 180/168, 167; 364/424

[56] References Cited

U.S. PATENT DOCUMENTS

| | | | |
|---|---|---|---|
| 4,032,758 | 6/1977 | Lewis | 318/587 X |
| 4,556,940 | 12/1985 | Kattoo et al. | 318/587 X |
| 4,593,239 | 6/1986 | Yamamoto | 318/587 |

FOREIGN PATENT DOCUMENTS 0187712  11/1982  Japan ................... 318/587

*Primary Examiner*—Benjamin Dobeck
*Attorney, Agent, or Firm*—Darby & Darby

[57] ABSTRACT

This invention relates to a novel guiding method for autonomous traveling vehicle in which the number of the rotation of wheels mounted on both the right and left sides are individually detected when guiding the vehicle along the predetermined route by independently controlling the rotation of the wheels mounted on both the right and left sides, and then based on the number of the rotation of these wheels, the position and the azimuth of the vehicle are computed. Then, based on the computed position and the azimuth of the vehicle by referring to the predetermined route, the target position is set, and then, by the vehicle is made to travel toward the set target position. Setting the target positions and making the vehicle travel toward the target position are repeated so that the autonomous vehicle is guided to the route having been set. When marks are detected during the travel, fixed point correction in reference to the detected marks is executed. Moreover, yawing is corrected when the vehicle is guided to the predetermined route after the fixed point correction.

5 Claims, 6 Drawing Sheets

GUIDING METHOD FOR AUTONOMOUS TRAVELING VEHICLE

BACKGROUND OF THE INVENTION

1. Field of the Invention

The present invention relates to a guiding method for an autonomous travelling vehicle which is provided with a plurality of wheels mounted on both right and left sides, capable of independently rotating themselves.

2. Description of the Prior Art

Conventionally, there are a variety of guiding methods for making an autonomous vehicle, for example, autonomously travel itself. Typically, one of the conventional methods makes an unmanned vehicle travel along continuous routes which are preliminarily set either by guidance cables or by optical tapes and the like. Another conventional system guides an unmanned vehicle by making it identify environments of the travelling route by applying electric waves or light so that it can proceed on its own route in accordance with data thus identified. Another conventional method guides an unmanned vehicle by applying a presumptive navigation method.

However, the method which provides the unmanned vehicle with its route by means of guiding cables unavoidably obliges the investor to spend much expense and time for establishing the route. Actually, once the route is established, it cannot easily be modified or changed. As for an optical tape, due to soil deposited on its surface after continuous service for many years, accuracy for detecting the route of the unmanned vehicle unavoidably decreases. Furthermore, such a conventional method making the unmanned vehicle travel along its route using electric waves or light for identifying the environment of the route easily incurs unwanted interference from external factors, thus lowering the accuracy for correctly detecting the route.

To solve those problems mentioned above, the Japanese Patent Laid-Open No. 57-120118 (1982) proposes a method for guiding a travelling object such as an unmanned vehicle for example, by providing it with information of the route by applying a presumptive navigation method.

This system first detects the distance covered and the turning angle of the unmanned vehicle and then detects the present position and posture angle with respect to the reference point by seeking the sum of the traveling track in accordance with the detected information. Simultaneously, this method sets coordinate XY on the floor on which the vehicle travels as shown in FIG. 1, while it also sets the route C and fixed points P0, P1, P2,—on the route C. Using each of these fixed points for making up the origin, the method sets coordinate xy respectively so that the tangent of each of these fixed points can correctly match the axis y. The position of each fixed point is denoted by applying coordinate xy, the origin of coordinate xy is made of the next fixed point in the proceeding direction of the travelling vehicle. An operator preliminarily sets a specific angle formed with respect to the origin as the variable part of the posture angle of fixed points.

More particularly, as shown in FIG. 1, the operator preliminarily sets an angle $\theta m$ with axis y of the coordinate xy having the next fixed point $Pm+1$ as the origin against fixed point Pm in order that the angle $\theta m$ can become a variable part $\Delta\theta m$ of the posture angle of the fixed point Pm. While the unmanned vehicle travels, it sequentially seeks the traveling speed and the steerage angle by referring to the present position and the azimuth on the coordinate xy having the next fixed point $Pm+1$ as the origin, while the vehicle also refers to the deviation angle $\theta m$ against the origin $Pm+1$. The unmanned vehicle then subtracts the steerage angle from the variation $\Delta\theta m$ of the posture angle which has been read when passing through the fixed point Pm, and then the unmanned vehicle travels in the direction of the origin $Pm+1$ in order that the variation $\Delta\theta m$ can be reduced to zero. In other words, this is one of the origin-pursuing guiding methods for making the unmanned vehicle first read the variation $\Delta\theta m$ of the posture angle every time when it reaches the fixed point Pm and then repeats the identical running processes by sequentially renewing the origin $Pm+1$ in order that it can correctly follow up travelling by being guided throughout the route.

Conventionally, any of those guiding methods using the presumptive navigation method provides means for confirming and correcting for the absolute position of the travelling object, which can be executed in any optional location of the route. Conventionally, a method called "fixed-point correction method" is known, which makes the unmanned vehicle firstly identify the externally provided marks before eventually confirming and correcting for the absolute position of the travelling vehicle itself.

The Japanese Patent Laid-Open No. 51-53870 (1976) proposes a method in conjunction with the presumptive navigation method for detecting the present position and the azimuth of the travelling object, where this invention provides means for allowing the control system of the travelling object to independently count the number of pulses generated by a pair of pulse counters installed on the left and right wheels respectively of the travelling object at every extremely short period of time, and then based on the counted values, the control system computes variation of the average speed and the azimuth of the travelling object before eventually determining the present position and the azimuth of the travelling object.

As is clear from the above description, the guiding method proposed by the invention related to the Japanese Patent Laid-Open No. 57-120118 (1982) obliges the operator to preliminarily and sequentially store data related to the variable values of the posture angle of the travelling object at a number of objective points provided on the routes into memory means, thus involving complex procedures. Furthermore, despite being the guiding method based on the presumptive navigation method, this invention however does not specify means for correcting for guidance error that may take place with the presumption error.

On the other hand, according to the invention related to the Japanese Patent Laid-Open No. 51-53870 (1976), since the present position and the azimuth of the travelling object are detected in accordance with the rotation of wheels, errors can easily be generated by either slipping or noise of these wheels, thus eventually causing deviation to occur to the present position and the azimuth of the travelling object. In addition, since this invention is totally dependent on the externally provided units for identifying error and deviation, this method can only execute rough correction thus unavoidably resulting in the poor guidance accuracy.

SUMMARY OF THE INVENTION

The present invention has been achieved to completely solve those problems mentioned above. The primary object of the present invention is to provide a novel guiding method for an autonomous travelling vehicle capable of correctly guiding it along the predetermined route without requiring complex procedure for preliminarily storing a variety of data related to each objective point needed for guiding the autonomous vehicle, while the invention totally dispenses with setting of route conventionally made of guidance cables or optical tapes.

The second object of the present invention is to provide a novel method featuring significantly improved accuracy in guiding the autonomous vehicle by allowing its control system to execute the fixed point correction in order to correct the present position and the azimuth of the autonomous vehicle during its travelling.

The third object of the present invention is to provide a novel method for guiding an autonomous vehicle in which the guidance system is capable of inhibiting yawing of the travelling object like an autonomous vehicle by adding the yawing correction factor based on either or both the lateral displacement (i.e., the displacement of orthogonal component to the travelling direction), and azimuth displacement, to the fixed point correction factor.

The novel method for guiding the autonomous vehicle reflecting the preferred embodiment of the present invention first detects the number of the rotations of wheels on both sides of the autonomous vehicle in guiding the vehicle along the predetermined routes. Based on this result, the guidance method computes the present position and the azimuth of the travelling vehicle and then sets the guiding target position in accordance with the computed present position, the azimuth, and the predetermined routes so as to eventually guide the autonomous vehicle by repeatedly setting the guiding target position mentioned above and making the autonomous vehicle travel in the direction of the guiding target position. Furthermore, as described above, when the autonomous vehicle passes through the correction point during its travelling the fixed points correction is executed by referring to the passed correction point as the reference, and simultaneously, the method adds a certain correction factor needed for inhibiting the autonomous vehicle from incurring yawing.

The above and further objects and features of the invention will more fully be apparent from the following detailed description with accompanying drawings.

DESCRIPTION OF THE PREFERRED EMBODIMENTS

Figure 1:
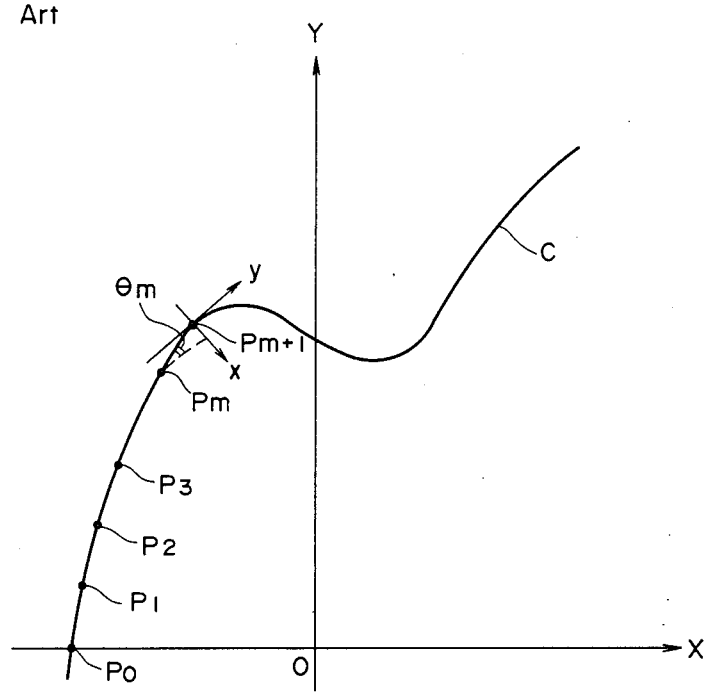
FIG. 1 is the simplified conceptual diagram of a conventional guiding method.
Figure 2:
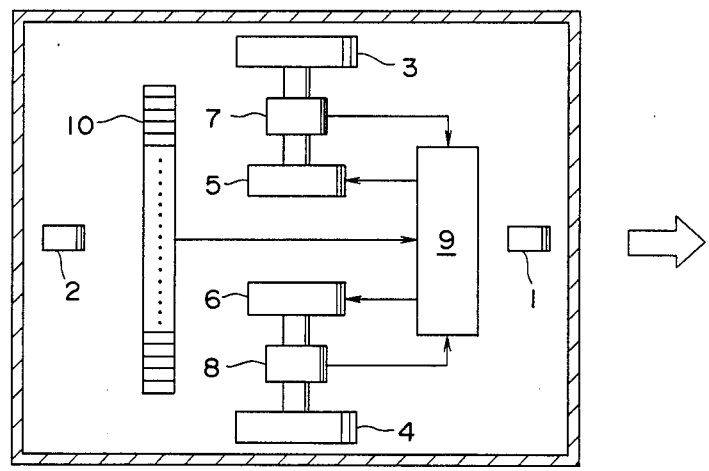
FIG. 2 is the simplified schematic diagram denoting the constitution of an unmanned vehicle.

Referring more particularly to the accompanying drawings, one of the preferred embodiments of the present invention is described below. FIG. 2 is the simplified schematic diagram denoting the constitution of an autonomous unmanned vehicle. Casters 1 and 2 are respectively installed on the front and rear edges of the autonomous unmanned vehicle.

A pair of wheels 3 and 4 are respectively installed on both sides of the unmanned vehicle in its center portion in the travelling direction, and these wheels are driven by motors 5 and 6, respectively. These wheels 3 and 4 are provided with a pulse generator 7 and 8 respectively which generate pulses in accordance with the number of times of the rotations of these wheels 3 and 4. Control circuit 9 reads pulses from pulse generators 7 and 8 and discretely controls the speed and direction of the rotation of motors 5 and 6 in order to correctly control the travelling speed and direction of the unmanned vehicle by driving the wheels 3 and 4 for executing the needed steering operation.

Figure 3:
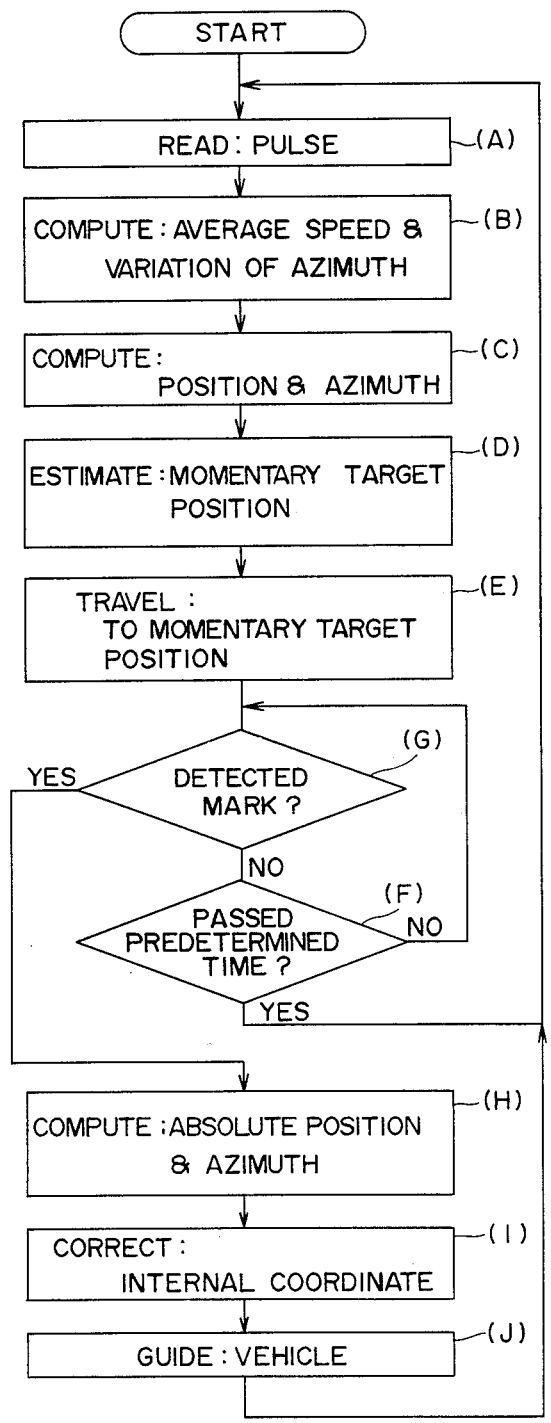
FIG. 3 is the operation flowchart describing the operation procedure of the guiding method related to the present invention.

Referring now to the operation chart of FIG. 3, the guiding method of the present invention for the autonomous unmanned vehicle having the above constitution is described below.

At first, assume that the coordinate XY (hereinafter called the external coordinate) is set on the floor as a basis for computing the absolute position of the vehicle and its azimuth. And at the control circuit 9 of the vehicle, the coordinate xy (hereinafter called the internal coordinate) is set as a control basis for the vehicle itself. At the starting of controlling, the internal coordinate coincides with the external one. Further, the travelling route of the vehicle being set on the external coordinate is also set on the internal one, and the vehicle is basically to be so guided as to go along with the route being set on the internal coordinate.

When operational step A is executed, control circuit 9 discretely reads pulses generated by pulse generators 7 and 8 in response to the rotation of wheels 3 and 4 on both sides of the vehicle, and then based on the number of times of pulses counted, the control circuit 9 computes the average speed and the amount of varied azimuth of the travelling vehicle during step B. Next, based on the computed average speed and the amount of varied azimuth, the control circuit 9 then seeks the present position and the azimuth of the travelling vehicle on the internal coordinate xy during the next step C. The control circuit 9 then provisionally determines a momentary target position based on the present position, the azimuth, and the predetermined route of the vehicle during the next step D. When step E is executed, the control circuit 9 guides the vehicle in the direction of the target position. When step F is executed, the control circuit 9 causes the entire guiding method to repeatedly follow up those sequential processes mentioned above at every specific time so that the vehicle can correctly be guided to travel the predetermined route.

A pair of magnets functioning as a unit of correction point are positioned along the route on the floor. When the vehicle passes through the correcting point, a sensor 10 of the vehicle detects the presence of these magnets during the next step G. This makes the control circuit 9 correctly compute the absolute position and the azimuth of the travelling vehicle on the external coordinate XY provided on the surface of the route during the next step H. When step I is executed, the control circuit 9 substitutes the present position and the azimuth of the travelling vehicle on the internal coordinate during computation for the computed absolute position and the azimuth of this vehicle to complete correction for the internal coordinate so as to be coincided with the external one. After completing correction for the internal coordinate, step G is executed, where the guiding method leads the travelling vehicle to the predetermined route while inhibiting occurrence of yawing.

Next, actual methods of detecting the position and the azimuth and of guiding the travelling vehicle and of the correction are described below by applying operational equations.

Assume that the autonomous travelling vehicle starts its travel from an optional position and the sampling period of pulse signals from the pulse generators 7 and 8 is $\tau$, whereas the order of sampling period is i. The order of sampling period i denotes the order of the control over a series of guiding the travelling vehicle including computation of the present position and the azimuth of the vehicle, provision of momentary target position, and the fixed points correction, to be described later on. Assume that the number of pulses generated from the rotation of the left and right wheels 3 and 4 during a sampling period $\tau$ from time $i\tau$ is respectively denoted to be $P_{Li}$ and $P_{Ri}$, whereas the travelling distance of these wheels 3 and 4 per pulse is respectively denoted to be $H_L$ and $H_R$, and then the speeds $V_{Li}$ and $V_{Ri}$ of the left and right wheels respectively and the average speed $V_{ci}$ at the center point (called the representative point of the vehicle) of these wheels 3 and 4 are denoted by equations shown below.

$$V_{Li} = H_L \cdot P_{Li}/\tau \quad (1)$$

$$V_{Ri} = H_R \cdot P_{Ri}/\tau \quad (2)$$

$$V_{ci} = (V_{Li} + V_{Ri})/2 \quad (3)$$

Assume that tread between wheels on both the sides is T, and then, the amount of varied azimuth of the vehicle $\Delta\theta_{ci}$ is denoted by the equation shown below.

$$\Delta\theta_{ci} = (V_{Li} - V_{Ri})\tau/T \quad (4)$$

where $H_L$, $H_R$, and T are respectively the coefficients to be constantly determined by the travelling vehicle specification (hereinafter called the vehicle factor). Forward turn of $P_L$ and $P_R$ is denoted to be plus, whereas inverse turn of $P_L$ and $P_R$ is denoted to be minus.

Assume that the position of the representative position of the vehicle at a period of time $(i-1)\tau$ is $c_i-1$ $(x_{ci}-1, y_{ci}-1)$ and the forwarding direction $\theta_{ci}-1$, approximate position of the vehicle at time $i\tau$ and approximate forwarding azimuth $\theta_{ci}$ at time $i\tau$ are respectively denoted by equations shown below.

$$x_{ci} = x_{ci-1} + V_{ci} \cdot \tau \sin(\theta_{ci-1} + \Delta\theta_{ci}/2) \quad (5)$$

$$y_{ci} = y_{ci-1} + V_{ci} \cdot \tau \cos(\theta_{ci-1} + \Delta\theta_{ci}/2) \quad (6)$$

$$\theta_{ci} = \theta_{ci-1} + \Delta\theta_{ci} \quad (7)$$

When seeking the average speed of the vehicle by applying equation (1) through (3), certain areas of wheels 3 and 4 respectively remain in contact with the floor surface. In this case, a certain point of these areas is considered to be the representative point, while assuming that the vehicle travels its route at a constant speed. When applying equations (4) through (7), travelling path of the vehicle is considered to be linear. However, since the sampling period $\tau$ denotes an extremely short duration, no substantial error can take place. When applying equations (1) through (7) when $P_{Li}$ and $P_{Ri}$ are both negative, the vehicle travels backward, whereas when either of $P_{Li}$ and $P_{Ri}$ is positive and the other negative, the vehicle keeps on moving while making spin turns.

Figure 4:
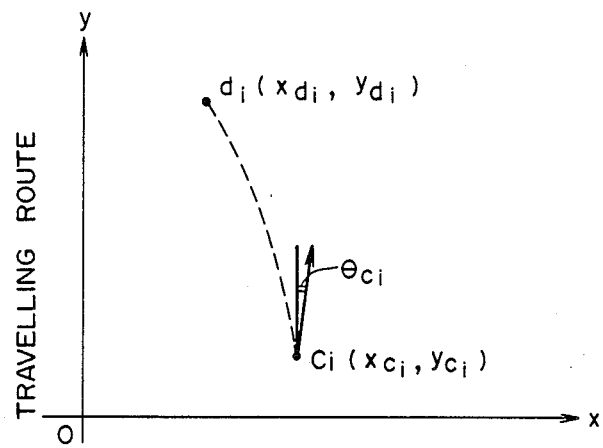
FIGS. 4 and 6 are respectively the conceptual diagram denoting the conditions of guiding an unmanned vehicle related to the preferred embodiments of the present invention.

Next, the method of guiding the vehicle to the predetermined route is described below. Assume that the linear route is provided in this case and it correctly matches axis Y. Like wise, it is assumed that, after starting off from the origin of the external coordinate, the travelling vehicle kept on travelling, and then it travels off from the route and has reached the present position Ci ($x_{ci}, y_{ci}$) of the internal coordinate in the azimuth denoted to be $\theta_{ci}$. Accordingly, the deviation of position of the vehicle is denoted to $x_{ci}$ and the deviated amount that of azimuth $\theta_{ci}$, respectively. Based on the travelling speed $V_{ci}$ of the vehicle at position $c_i$ when those deviated amounts are present, the vehicle guiding operation is executed by provisionally setting the momentary target position $d_i$ ($x_{di}, y_{di}$) shown in FIG. 4. The target position $d_i$ is denoted by the equations shown below.

$$x_{di} = K1 x_{ci} + K2 \theta_{ci} \quad (8)$$

$$y_{di} = y_{ci} + K2|\theta_{ci}| + K3 V_{ci} + K4 \quad (9)$$

$$[0 \leq K1 < 1, 0 \leq K2, 0 < K3, K4]$$

Note that K1 through K4 respectively denote coefficients or constants adjusting weight of each deviated amount, in particular, K1 denotes the position coefficient, K2 the azimuth coefficient, K3 the velocity coefficient, and K4 the position constant, respectively.

Figure 5:
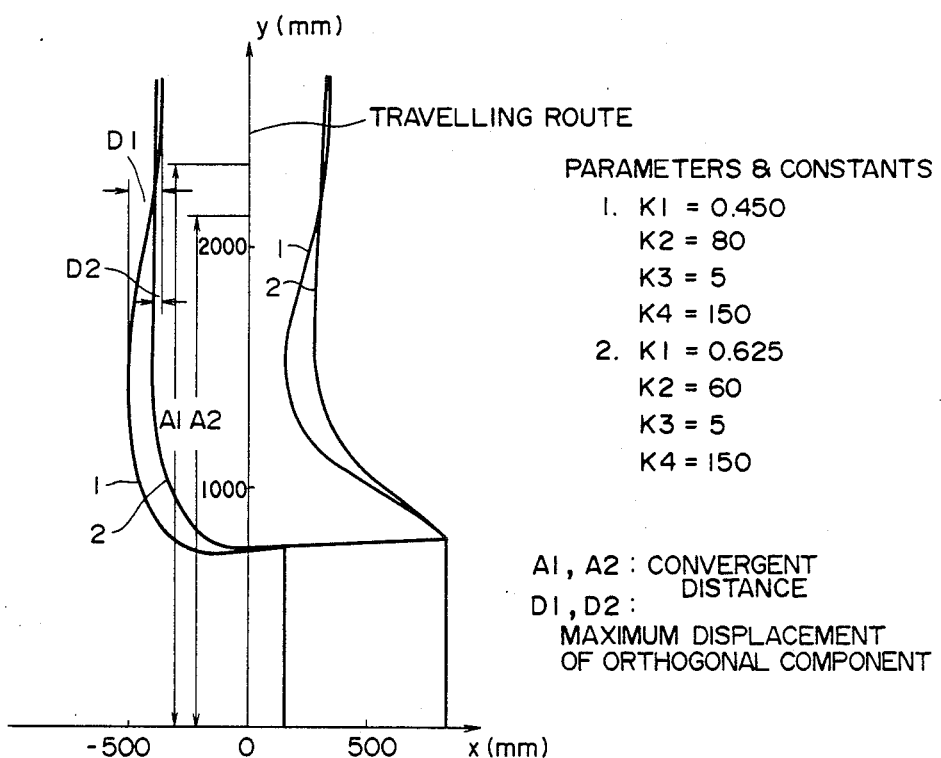
FIG. 5 is the schematic presentation of the guiding path of the unmanned vehicle using varied constant.

FIG. 5 is the chart denoting that the vehicle guiding path varies when the values of K1 and K2 are varied. Based on this, it is possible for the guiding method related to the present invention to fixedly set an optimum coefficient by preliminarily executing experiments or simulated measurements while varying coefficients. When the azimuth of the vehicle excessively deviates, the guiding method related to the invention also makes it possible to set the momentary target position at a relatively far point to allow the front end of the vehicle to moderately vary its direction to effectively prevent the vehicle from incurring yawing. Conversely, when the azimuth of the vehicle negligibly deviates, it is also possible for the guiding method related to the invention to set the momentary target position at a point close to it and set a plurality of coefficients in order that the actual route of the vehicle can be converged into the predetermined route within a short distance so that an optimum coefficient can be chosen from a plurality of coefficients depending on the circumstances.

Figure 6:
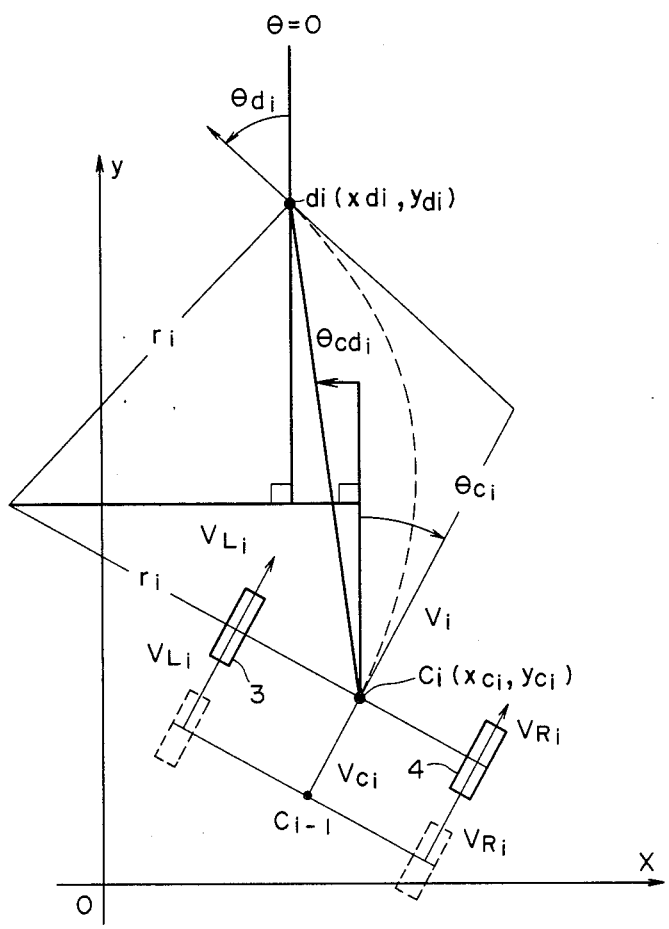

The preferred embodiment employs means for allowing the vehicle to travel in the manner of drawing an arc between positions $c_i$ and $d_i$. As shown in FIG. 6, this method calculates the designated velocity $V_{Li,cmd}$ and $V_{Ri,cmd}$ of wheels on both sides of the vehicle when the vehicle travels along the assumed arc within a sampling period $\tau$ from time $i\tau$ passing through position $c_i$ and $d_i$, the arc being in contact with the line extended in the vehicle forwarding direction forming angle $\theta_{ci}$ against axis y. Based on the relationship shown in FIG. 6, angle $\theta_{ci}$ seen from position $c_i$ to position $d_i$ is geometrically denoted by the equation shown below.

$$\theta_{cdi} = \tan^{-1}\{(x_{di}-x_{ci})/(y_{di}-y_{ci})\} \quad (10)$$

Next, based on the relationship shown in FIG. 6, the travelling azimuth $\theta_{di}$ of the vehicle and radius $r_i$ of the turning of the vehicle when the vehicle is exactly at position $d_i$ after travelling along the above arc are geometrically calculated by the equations shown below.

$$\theta_{di} = 2\theta_{cdi} - \theta_{ci} \quad (11)$$

$$r_i = |(y_{di}-y_{ci})/\sin\theta_{di} - \sin\theta_{ci}| \quad (12)$$

On the assumption that the command average velocity within a period $\tau$ from time $i\tau$ is $V_i$ and based on the radius value $r_i$, the command velocity of both wheels 3 and 4 during the left turn (where $\theta_{ci} > \theta_{di}$) can be calculated by the equation shown below.

$$V_{Li,cmd} = (r_i - T/2)V_i/r_i$$

$$V_{Ri,cmd} = (r_i + T/2)V_i/r_i \quad (13)$$

Conversely, the command velocity of both wheels 3 and 4 during the right turn (where $\theta_{ci} > \theta_{di}$) can be calculated by the equation shown below.

$$V_{Li,cmd} = (r_i + T/2)V_i/r_i$$

$$V_{Ri,cmd} = (r_i - T/2)V_i/r_i \quad (14)$$

By repeatedly executing operations denoted by those equations (1) through (14) shown above at every period $\tau$, the guiding method related to the present invention correctly guides the vehicle throughout its route having a number of minimal arcs with a radius being different from each other, and connected to each other smoothly so that the vehicle can eventually be converged into axis y which is actually the predetermined route.

To smoothly guide the vehicle in any circumstances, the guiding method related to the present invention divides distance between the target position $d_i$ on the internal coordinate and the present position $c_i$ ($x_{ci}$, $y_{ci}$) of the vehicle into three steps in reference to their relative position relationship so that the command velocity $V_i$ of the vehicle can properly be controlled by applying three different steps including acceleration, constant speed, and deceleration. The command velocity is sought by the equations shown below.

During acceleration $V_i = \alpha i\tau [0 \leq y_{ci} < L_{acc}] \quad (15)$

During constant-speed $V_i = V_{const}[L_{acc} \leq y_{di}, L_{ri} > L_{acc}] \quad (16)$ During deceleration $V_i = V_{const}\sqrt{\dfrac{L_{ri}}{L_{acc}}} \ [L_{ri} < L_{acc}] \quad (17)$ where $\alpha$ indicates acceleration (mm/s$^2$),
Vconst indicates the designated speed (mm/s),
$y_{di}$ indicates coordinate (mm) of the momentary target position axis y, $L_{ri}$ indicates the distance remaining to the target position (mm) = $y_{di} - y_{ci}$, and
$L_{acc}$ indicates Vconst$^2/2\alpha$ Next, the guiding method controls velocity by applying PID (proportional plus integral plus and derivative) control means to the command velocity $V_{Li}$, cmd and $V_{Ri}$, cmd of both wheels 3 and 4 calculated by the above equations (13) and (14). This is denoted by the equations shown below.

$$EV_{Li} = V_{Li,cmd} - V_{ci} \quad (18)$$

$$V_{Li,out} = \quad (19)$$

$$V_{Li,cmd} + G1 EV_{Li} + G2 \sum_{n=1}^{i} EV_{Ln} + G3(EV_{Li} - EV_{Li-1})$$

where $V_{ci}$ denotes the average velocity of both wheels at the present position $c_i$, whereas $V_{Li}$ out denotes the left-wheel command velocity output value, and G1 through G3 are respectively the control coefficients. Equations (18) and (19) respectively denote the control of the velocity of the left wheel 3. The same equation is applicable to the control of the velocity of the right wheel. Execution of the control of the velocity of the travelling vehicle allows wheels to smoothly rotate themselves so that external irregularity of the rotation of wheels caused by slipping can be prevented.

However, while guiding the travelling vehicle based on the position and the azimuth of the vehicle itself on the internal coordinate, a certain deviation takes place between the position and the azimuth of the vehicle on coordinate XY (external coordinate) which is conceptually provided on the surface of the route and the position and the azimuth of the vehicle on coordinate xy (internal coordinate). In other words, since the position and the azimuth of the travelling vehicle are respectively determined by accumulative computations of minimal amounts of varying positions and azimuths of the travelling vehicle, erroneous data can easily be generated by noise caused by uneven route surface and/or slip movement of wheels, while certain errors can also accumulate themselves due to inadequate vehicle coefficients $H_L$, $H_R$, and T related to equations (1), (2), and (4) shown earlier. This eventually causes a certain deviation to take place with the results of computing operations.

To thoroughly eliminate these errors from the computing operations, even the slightest deviation of the position on the internal coordinate against the absolute position of the travelling vehicle should be corrected at an optional position.

Figure 7:
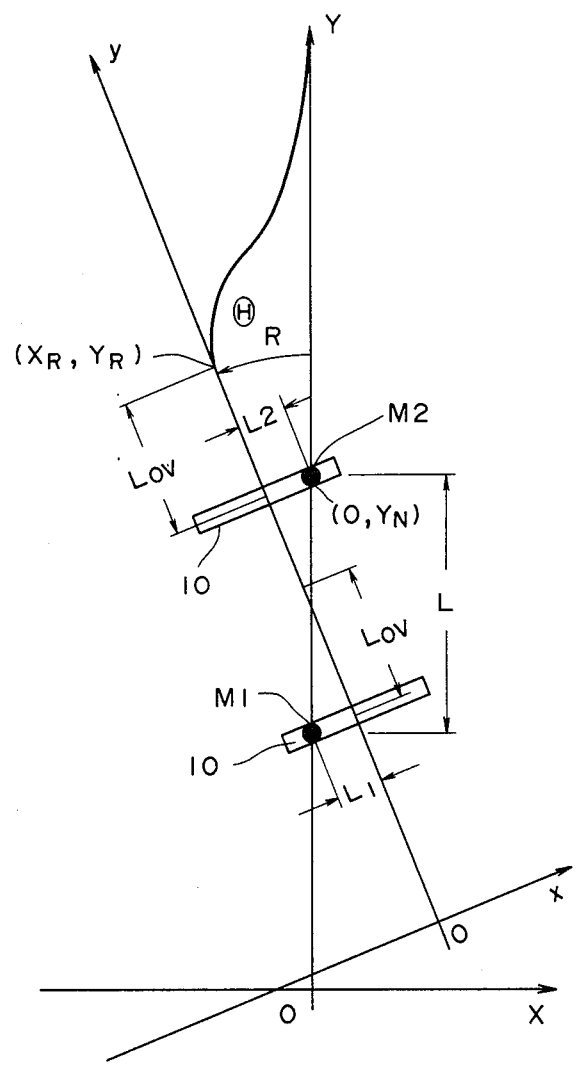
FIG. 7 is the chart explaining the principle of the error correction using magnet.

Actually, one of the prior arts has developed a method for correcting the position on the internal coordinate deviated from the absolute position of the travelling vehicle by applying a reference object being set on either the surface of the route or the lateral position of the route. However, the preferred embodiment of the guiding method of the invention implements; the fixed point correction by applying a plurality of magnets positioned on the surface of the route at predetermined intervals. Referring now to FIG. 7, the correction procedure of the invention is described below.

A pair of magnets M1 and M2 are positioned on the predetermined route, hereupon, on axis Y at intervals L. Assume that magnet M1 at the start-up point of the vehicle is designated to be the advance node, whereas magnet M2 in front of the vehicle forwarding direction is designated to be the correction node $(O, Y_N)$. As shown in FIG. 2, the center bottom part of the vehicle is provided with a magnet sensor 10 in which a plurality of magnetism-sensing elements are installed in parallel with each other in the lateral direction to the forwarding direction of the vehicle.

As soon as the vehicle passes through magnets M1 and M2 on the surface of the route while travelling itself in accordance with the route on the internal coordinate, magnet sensor 10 detects lateral displacement L1 and L2, more particularly, the displacement of orthogonal component of the target position to the travelling direction are respectively detected by magnetic sensor 10. On the assumption that the vehicle proceeds distance $L_{OV}$ while the correction computation is underway after those displacement amounts are detected, points $X_R$ and $Y_R$ are respectively designated to be the position at which operation for correction of the deviated internal coordinate position starts off.

The correction start-up positions $X_R$ and $Y_R$ and the azimuth $\theta_R$ can geometrically be computed in reference to FIG. 7 by applying equations shown below.

$$\theta_R = \tan^{-1}\{(L1-L2)/L\} \quad (20)$$

$$X_R = -L2 \cdot \cos\theta_R + L_{OV} \cdot \sin\theta_R \quad (21)$$

$$Y_R = Y_N - |L2| \cdot \sin|\theta_R| + L_{OV} \cdot \cos\theta_R \quad (22)$$

By substituting values of positions $x_{ci}$ and $y_{ci}$ and azimuth value $\theta_{ci}$ of the vehicle containing the accumulated error on the internal coordinate for values $X_R$ and $Y_R$ related to the absolute position and the azimuth value $\theta_R$ of the vehicle on the external coordinate thus calculated, the internal coordinate correctly coincides the external coordinate, and as a result, the state is initialized to eventually complete the designated operation for correcting the displacement of the position on the internal coordinate.

To implement correction of the displaced position on the internal coordinate, a pair of reference points are needed. The preferred embodiment of the present invention applies a pair of magnets as the correction points. Every time the travelling vehicle passes through these correction points, the internal coordinate is initialized and the displacement on the internal coordinate against the external coordinate is corrected so that the vehicle can correctly be guided throughout the predetermined route on the floor.

On the other hand, while the fixed-point correction is underway, since the displacement between the external and internal coordinates is greater than the displacements of the position, and the azimuth of the movement of the vehicle during normal travelling, a certain problem may arise from the vehicle guiding operation, which is described below.

Since magnet sensor 10 has a specific width corresponding to that of the vehicle itself, the representative point of the vehicle may not always be present on the route even after the fixed point correction. As a result, when the vehicle is led to the predetermined route from a position apart from the route having the fixed point correction, if the momentary target position is determined by applying equations (8) and (9) which allow the vehicle to converge into the route for a short period in reference to a relatively small amount of displacement, the momentary target position is to be set to a point where the vehicle forwarding azimuth is significantly variable, thus obliging the vehicle to also noticeably vary its forwarding direction. Consequently, after the fixed point correction, when the vehicle proceeds to a point where the forwarding azimuth is significantly variable, the speed of the rotation of both wheels significantly increases or decreases (see equations (10) through (14)). Due to drastically variable speed of the command rotation speed of wheels after the fixed point correction, the vehicle itself unavoidably incurs yawing while the initial guiding operation is underway.

After the fixed point correction, to securely prevent the vehicle from incurring yawing while guiding the vehicle, in addition to the foregoing equation (8), an equation (8-1) is introduced, which is shown below.

$$x_{di} = K1 x_{ci} + K2 \theta_{ci} + K5 f(j-i) x_{ci} \quad (8-1)$$

where j is the positive integer defined below and K5 denotes constant.

Function $f(j-i)$ shown in the third term of the right-side of equation (8-1), i.e., the yawing inhibition term, is subjected to the following definitions.

$$f(j-i) = j - i \,(\leq j < i+m) \quad (a)$$

$$f(j-i) = 0 \,(j<i,\ i+m \leq j) \quad (b)$$

where m denotes the set number of momentary target positions during a period from the correction of fixed point to the termination of yawing.

Figure 8:
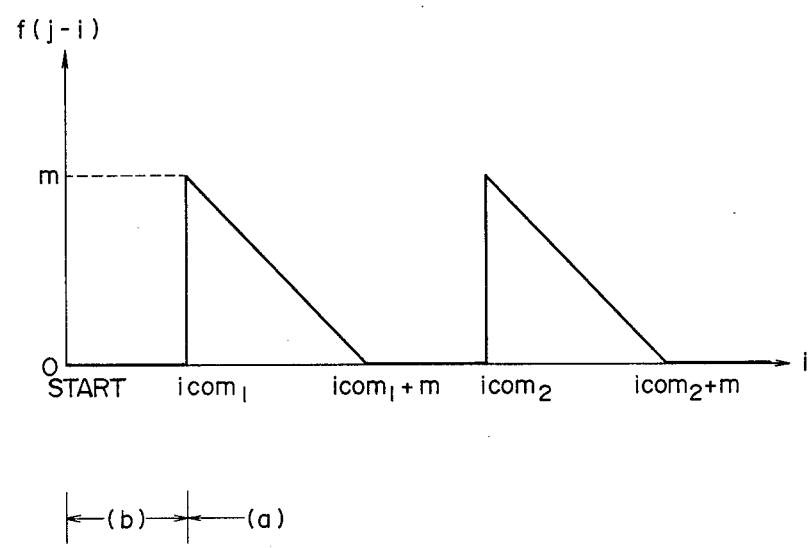
FIG. 8 is the chart denoting the varied function related to one of the preferred embodiments of the present invention.

FIG. 8 denotes the variation of function $f(j-i)$ shown in equation (8-1), in which vertical and horizontal axes respectively denote function and time; i com denotes the order of executing the fixed point correction among the order of i; and the subscripts appended to i com respectively denote the number of times of executing the fixed point correction. After the fixed point correction, the value of function is maximum when the vehicle is at a position farthest from the predetermined route. The value of function diminishes every time when the control operation is executed for guiding the vehicle to its travelling route, whereas the value of function remains zero during a period from i com + m to the implementation of the next operation for the fixed point correction.

While the vehicle keeps on moving itself, since inhibition of yawing is not actually needed until the first fixed point correction is implemented, the following equation is made available, where n denotes the number of times of executing the fixed point correction.

$$j = 0 \,(0 \leq i < icom_n,\ n=1)$$

$$j = icom + m \,(icom_n \leq i,\ n=2)$$

Compared to the guidance operation executed during normal travelling of the vehicle, the momentary target position is provided at a still farther position in the direction of crossing the forwarding direction of the vehicle in right angle by adding the yawing inhibition term to the vehicle guiding operation after the fixed point correction. This decreases the amount needed for varying the forwarding direction of the vehicle, thus effectively minimizing variation of the speed of the rotation of wheels to eventually inhibit yawing of the vehicle itself.

The above preferred embodiment of the present invention sets the yawing inhibition term in accordance with the lateral displacement of the travelling vehicle. However, it is also possible for the guiding method of the invention to employ the yawing inhibition term by additionally applying the displacement amount of azimuth using an equation shown below.

$$x_{di}=K1x_{ci}+K2\theta_{ci}+K5f(j-i)x_{ci}K6f(j-i)|\theta_{ci}| \qquad (8\text{-}2)$$

The above preferred embodiment sets the momentary target position at a still farther position in the direction of crossing axis y in right angle than the position of executing guiding operation during normal travelling, thus making it possible for the guiding method related to the invention to effectively constrain the forwarding azimuth and variation of the speed of the vehicle itself. However, the guiding method related to the present invention provides the same effect as above by setting a target position remote from the forwarding direction of the vehicle.

A pair of magnets constituting a unit are used for making up the point of fixed point correction in the above preferred embodiment. It should be understood, however, that the present invention is not limitative of using only these magnets.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A guiding method for an autonomous travelling vehicle which travels along a predetermined route by individual control of rotation of the wheels mounted on both right and left sides of the travelling direction thereof so that the travelling direction of said autonomous travelling vehicle is controlled, wherein a plurality of marks are previously arranged along said route for fixed point correction, said method comprising the steps of:

detecting the number of the rotations of each of said wheels;

computing the position and azimuth of said autonomous travelling vehicle based only on the detected number of rotations of said wheels;

setting a target position to be reached by said autonomous travelling vehicle based on computed position, azimuth and said route;

causing said autonomous travelling vehicle to travel toward said target position;

guiding said autonomous travelling vehicle toward said route by repeating said step for setting target position and said step for causing said autonomous travelling vehicle to travel toward said target position; and correcting the calculated position and azimuth when one of said marks is detected;

a yawing correction component determined by the number of setting said target position after the last step for correcting the calculated position and azimuth being used in determining an orthogonal component to the travelling direction of the target position.

2. A guiding method for an autonomous travelling vehicle as set forth in claim 1, wherein said marks for fixed point correction are a pair of marks arranged along said route of said autonomous travelling vehicle.

3. A guiding method for an autonomous travelling vehicle as set forth in claim 2, wherein said marks are magnets.

4. A guiding method for an autonomous travelling vehicle as set forth in claim 1, wherein said yawing correction component is the displacement of orthogonal component to the travelling direction of the target position from said predetermined route.

5. A guiding method for an autonomous travelling vehicle as set forth in claim 1, wherein said yawing correction component is the displacement of azimuth of said autonomous travelling vehicle from said predetermined route.

* * * * *